April 23, 1968   H. W. KAATZ   3,379,135
TORSIONAL COUPLING

Filed March 28, 1966   2 Sheets-Sheet 1

INVENTOR.
HERBERT W. KAATZ
BY Bosworth, Sessions
Herrstrom & Knowles
ATTORNEYS

April 23, 1968   H. W. KAATZ   3,379,135
TORSIONAL COUPLING
Filed March 28, 1966                                    2 Sheets-Sheet 2
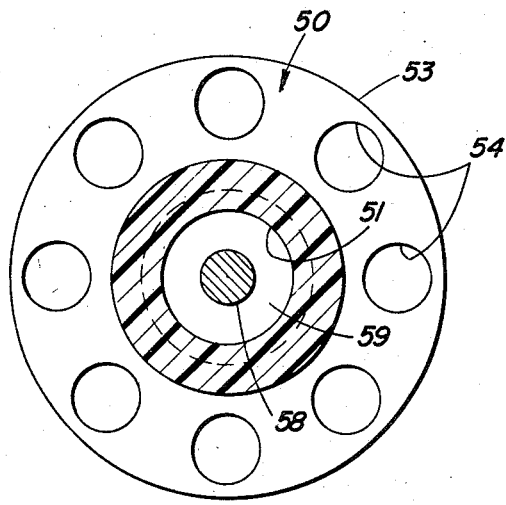
FIG. 3
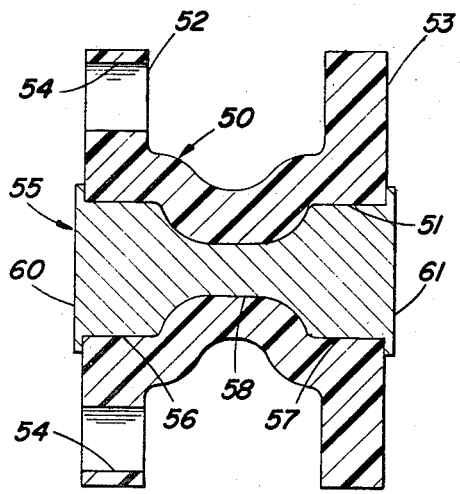    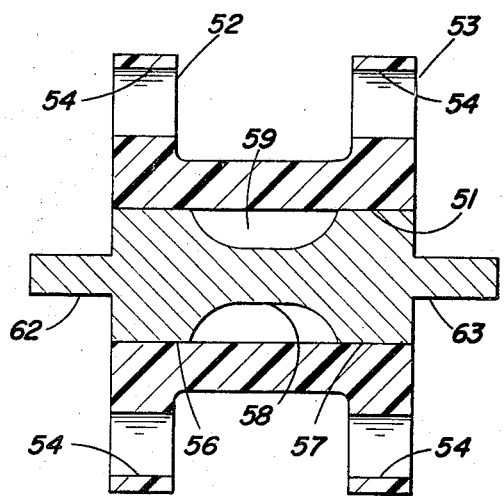
FIG. 4          FIG. 5
INVENTOR.
HERBERT W. KAATZ
BY *Bosworth, Sessions,*
*Herrstrom & Knowles*
ATTORNEYS

3,379,135
TORSIONAL COUPLING
Herbert W. Kaatz, Elyria, Ohio, assignor to Airborne
Mfg. Co., Elyria, Ohio, a corporation of Ohio
Filed Mar. 28, 1966, Ser. No. 537,995
10 Claims. (Cl. 103—202)

ABSTRACT OF THE DISCLOSURE

A torsional coupling for connecting a drive shaft to a coaxial load shaft and for isolating the rotary load from torsional vibrations transmitted by the rotary drive. The coupling utilizes a tubular elastomeric dampening member in cooperation with other structure, the various parts being so arranged as to provide a non-linear spring characteristic for the elastomeric dampening member.

---

The present invention relates to vibration dampening devices and more particularly to a coupling for isolating a rotary load from torsional vibrations transmitted by a rotary drive.

While the inveition has utility in connection with many types of rotary equipment, it is particularly adapted for use in fluid pumps such as sliding-vane-type rotary vacuum pumps disclosed in U.S. Patent No. 3,286,913. Vacuum pumps of this type are used primarily in connection with vacuum-operated flight instruments used in small aircraft. Such instruments include auto-pilots, gyro-compasses and turn-and-bank indicators.

The drive for the vacuum pump is generally supplied by a reciprocating aircraft engine such as through an engine accessory drive shaft. For this reason, the input shaft that provides the drive for the vacuum pump transmits an uneven torque which normally includes several harmonic vibrational frequencies depending on engine r.p.m., engine load and flight conditions. The resultant of these harmonic vibrations under normal circumstances has been found to have a wave form which is substantially steep-sided and contains the sum of numerous odd and even order frequencies to very high values as indicated by experiments conducted on several types of reciprocating aircraft engines.

These torsional vibrations with sharp wave forms have a serious destructive effect on rotary vacuum pumps particularly with respect to the type which use sliding carbon vanes to define and seal the pumping chambers. The destructive effect is most pronounced at the resonant frequency of the pump. Endurance tests have indicated, for example, that vane wear increases by a factor of from three to four times the expected wear rate when a pump is operated at its resonant frequency.

As a partial remedy for the vibration problem, means have been devised to dampen or reduce the torsional vibrations transmitted by the engine accessory drive shaft. In the vacuum pump disclosed in application Ser. No. 382,308, a torsional absorption coupling is interposed between the input drive shaft and the pump rotor. The coupling is made of an elastomeric material with good isolation and dampening characteristics provided by its hysteresis properties, polyurethane being a preferred composition. The coupling comprises a solid cylindrical member having radial flanges at each end with holes symmetrically spaced around the rims for connecting the coupling to the pump rotor shaft and the engine accessory drive shaft.

While this type of coupling reduces the torsional vibrations transmitted to the pump, its effectiveness is limited due to its relatively high stiffness or elastic restoring force and its ability to transmit vibrations of high amplitude to the pump at the resonant frequency of the coupling and pump assembly. Also, the Q factor is relatively high due to the mass of the material, high stiffness and low dissipative resistance; the Q factor being defined as the sharpness of the increases in the amplitude of vibrations as resonant frequency is approached. These factors enable the drive shaft to transmit torsional vibrations at the resonant frequency of the pump in a substantially undampened condition.

Several solutions suggested themselves, all of which have material limitations. From a torsional vibration standpoint, a softer coupling would be desirable. A reduced coupling diameter lowered the stiffness of the coupling and decreased the elastic restoring force but reduced the physical strength below desired limits. On the other hand, increasing the length of the coupling was impractical due to space limitations.

The unique coupling device of the present invention, however, provides a novel solution to the problems discussed above and affords advantages heretofore not obtainable.

According to the present invention there is provided a new and improved torsional coupling device for isolating a rotary load from torsional vibrations transmitted by a rotary drive, the device comprising a tubular torsion member formed of an elastomatic material and defining a central bore. Means are provided for connecting one end of the tubular member to the rotary drive and the other end to the rotary load. Located within the bore is a contoured rod having cylindrical portions which bear against the wall of the bore, and a central neck portion of smaller diameter which defines with the bore, an annular space when the device is in an unstressed condition. When a torsional load is applied to the device to angularly displace one end of the tubular member with respect to the other, the central portion of the member constricts radially inward into the space defined by the neck portion. However, the amount of construction is limited by the contoured rod and accordingly the resistance to axial twisting of the device increases at a rate that greatly exceeds a linear increase as this condition is reached.

As a supplementary aspect of the invention, the contoured rod is located in the bore with an interference fit whereby the friction between the surfaces of the end portions of the rod and adjacent surface portions of the bore resist rotary movement of the rod relative to the tubular member. This serves to further dampen oscillations induced by the drive shaft. The friction increases with twisting due to the tendency of the tubular member to constrict.

According to another aspect of the invention, the tubular member is preconditioned before attachment to the pump by twisting the ends thereof in opposite directions to a degree greater than that normally expected during operating conditions. This serves to lower the natural frequency of the tubular torsion member substantially and assures that the natural frequency will be well below the resonant frequency of the pump.

According to a more limited aspect of the invention, the contoured rod is provided with radial flanges at each end, the inner faces of which bear against the tubular torsion member and prevent axial elongation of the member during twisting. Also, the friction between the flanges and the tubular member increases the dissipative resistance of the coupling.

The unique construction of the coupling affords several important and unexpected advantages. The friction between the end portions of the contoured rod and the bore increases the dissipative resistance or dampening factor to an extent beyond that which would normally be provided by the physical characteristics of the tubular torsion member alone. The dissipative resistance is best defined as the dampening force per unit velocity and it reduces the tendency of the system to oscillate when subjected to a transient impulse. Also, because the elastomeric torsion member is tubular rather than solid and the tubular section has a controlling space into which it is allowed to collapse, it has a very soft spring characteristic when subjected to smaller angular deflections.

The softness of the spring characteristic disappears, however, when the coupling has been twisted sufficiently to constrict the central portion of the tubular torsion member into the space defined by the neck portion of the rod. When this condition is reached, the stiffness or elastic restoring force of the coupling increases very rapidly.

In view of the above characteristics of the device, the natural frequency of the device when subjected to low amplitude vibrations is relatively low, and much lower than the resonant frequency of the pump. Also, since the elastic restoring force of the device exhibits a non-linear increase in response to angular displacement of one end of the device with respect to the other, it is very difficult for the device to stabilize at a resonant frequency.

It is among the objects of the invention to provide a new and improved torsional coupling and vibration dampening device for isolating a rotary load from vibrations transmitted by a rotary drive.

Another object of the invention is to provide a torsional coupling device having an elastic restoring force which increases at a rate in excess of a linear rate in response to an increase in the amplitude of torsional vibrations.

A further object of the invention is to provide a torsional coupling which uses supplementary mechanical means for dampening oscillations induced in the device by torsional vibrations transmitted by a rotary drive.

A still further object of the invention is to provide a torsional coupling for isolating a sliding-vane-type rotary vacuum pump from torsional vibrations transmitted by an aircraft engine accessory drive shaft wherein the natural resonant frequency of the coupling is substantially below the resonant frequency of the pump.

Other objects, uses and advantages of the invention will be apparent from the following detailed description and drawings which are for the purpose of illustration rather than limitation, wherein like parts are identified by like numerals and wherein:

FIGURE 3 is a cross-sectional view taken on the lines 3—3 of FIGURE 2;

FIGURE 4 is a logitudinal sectional view similar to FIGURE 2 showing the torsional coupling in a condition wherein one end thereof is angularly displaced relative to the other end; and FIGURE 5 is a longitudinal sectional view similar to FIGURE 2 and showing a modified form of the invention.

Figure 1:
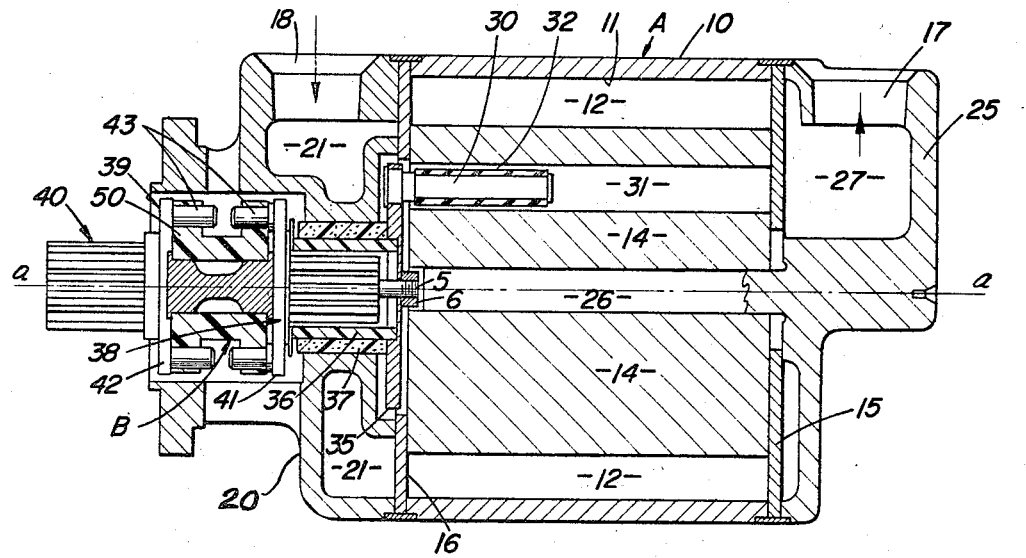
FIGURE 1 is a longitudinal sectional view of a rotary sliding-vane-type vacuum pump having a torsional coupling device embodying the invention.

Referring more particularly to the drawings, FIGURE 1 shows a sliding-vane-type rotary vacuum pump A having a torsional coupling B embodying the invention. The pump A comprises an annular body or ring 10 having an internal bore 11, the cam or contour of which controls the motion of sliding vanes 12 mounted in slots (not shown) in a rotor 14.

Located in opposite ends of the ring 10 are end plates 15 and 16, the plate 15 being disposed at the exhaust end of the pump or the right end as viewed in FIGURE 1 and having ports (not shown) communicating with the exhaust port 17. The end plate 16 is disposed at the intake end of the pump or the left-hand end as viewed in FIGURE 1 and has intake openings or ports which communicate with the intake port 18 through which fluid is drawn into the pump.

The left end of the pump A comprises the intake and drive housing 20 which defines the intake chamber 21.

Located at the right-hand end of the pump is an exhaust housing 25 which defines an exhaust chamber 27 and carries integrally and centrally a right circular cylindrical stub shaft 26 which rotatably supports the rotor 14, the stub shaft 26 providing a central journal for the rotor 14.

The rotor 14 is driven from its left end by symmetrically spaced metallic pins or pintles 30 which extend into longitudinal holes 31 in the rotor, the holes 30 being radially spaced from the central axis of the pump. The pins 30 are covered by a relatively soft, rubber-like sleeve 32 which fits snugly on each pin to afford a cushioned drive relation between the pins and the rotor.

The pins 30 are mounted on a driving disc 35 which is supported by a central bearing and driving sleeve 36, the sleeve being journaled in a bushing 37 for free rotation about the central axis of the pump. The sleeve 36 is splined internally to receive and be driven by external splines formed on an inner coupling element 38 which is connected to the torsional coupling B. Connected to the other end of the torsional coupling B is an outer coupling element 39 having a splined shaft 40 adapted to be connected to a rotary drive shaft.

The coupling elements 38 and 39 each have a radial flange 41 and 42 which carries symmetrically spaced marginal studs 43 which engage circular bores in the torsional coupling B in a manner which will be described below. The elements 38 and 39 are preferably made of fiberglass reinforced plastic or nylon, which is lightweight and yet strong enough to withstand the load experienced during operation. Molybdenum disulfide may be dispersed in the material to give a low friction characteristic to the surface.

Figure 2:
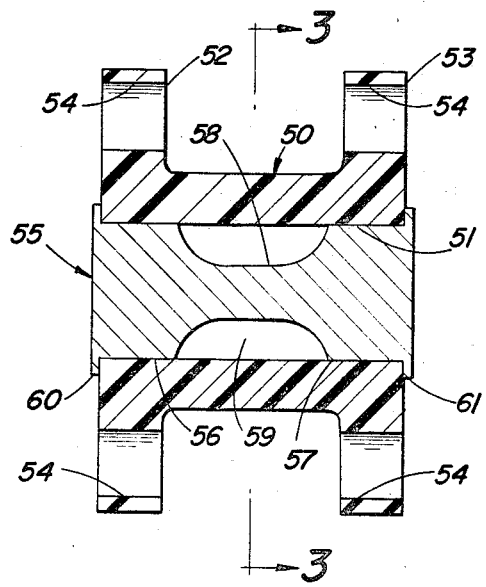
FIGURE 2 is a longitudinal sectional view of an enlarged scale of a torsional coupling embodying the invention and of the type used in the vacuum pump of FIGURE 1.

The torsional coupling B is best shown in FIGURES 2–4 and comprises a tubular torsion member 50 with a central circular bore 51 extending therethrough and radial flanges 52 and 53 located at each end. Formed in the radial flanges 52 and 53 are spaced symmetrical bores 54 which are adapted to receive the studs 43 of the coupling elements 38 and 39.

The tubular member 50 is preferably formed of an elastomeric material having a relatively low modulus of elasticity. Polyurethane has been found to be a preferred material; however, other elastomeric materials such as polypropylene and synthetic rubber may also be used.

Located within the bore 51 is a contoured rod 55 which has cylindrical end portions 56 and 57 having surfaces which bear against the walls of the bore 51. Located between the end portions 56 and 57 is a central neck portion 58 which defines a contoured surface of revolution having a diameter smaller than that of the end portions 56 and 57. In cross section the neck portion 58 defines a shallow curve such as a catenary or cycloid curve. The catenary curve is preferred as it provides the minimum surface area for the volume defined.

In any event, the neck portion 58 and the adjacent cylindrical wall portions of the bore 51 define an annular space 59 when the coupling is in a normal condition with no angular displacement between the opposite ends of the coupling.

However, when torque is applied to the coupling such that one end is angularly displaced relative to the other, the twisting of the tubular torsion member 50 causes constriction of the central portion thereof radially inward to fill the space 59 as best shown in FIGURE 4. Once the space 59 has been filled by the constricted portion of the torsion member 50, further constriction is prevented and, therefore, the stiffness or elastic restoring force of the coupling increases at a much higher rate as the torque is increased.

Located in opposite ends of the contoured rod 55 are radial flanges 60 and 61, the inner faces of which bear against the tubular torsion member 50 to prevent axial elongation thereof during twisting. Also, the friction between the inner faces of the flanges 60 and 61 and the adjacent surfaces of the torsion member 50, serves to dampen torsional oscillations induced in the coupling by the drive shaft. The friction increases as more torque is applied to the coupling because of the tendency of the torsion member to elongate axially when twisted.

Assembly of the coupling B is accomplished by forcing the rod 55 through the bore, the torsion member 50 being sufficiently expandable to accommodate the flanges 60 and 61.

The tubular torsion member 50 is preferably expanded slightly from its normal condition when the rod 55 is inserted so that a constricting force acts on the end portions 56 and 57. Accordingly, there is considerable frictional resistance to turning of the rod relative to the torsion member 50. This resistance serves to dampen torsional vibrations induced in the coupling by the rotary drive and thus increases the dissipative resistance. Since the "Q" factor is the ratio of the inertia and elastic restoring force of the device to its dissipative resistance at resonant frequency, this serves to minimize the amplitude of vibrations at the natural frequency of the coupling.

FIGURE 5 shows a modified form of the invention which differs from the embodiment of FIGURES 2–4 only in that the contoured rod 55 has projecting studs 62 and 63 on each end rather than the radial flanges 60 and 61. This embodiment is particularly suitable for some applications where some axial elongation of the torsion member during twisting is permissible.

For certain applications it is desirable to precondition the tubular torsion member 50 prior to assembly of the coupling B. This is accomplished by applying a controlled static torsional load to the member 50 to cause a measured deflection, the load being greater than that normally expected during operation, but not enough to cause rupture or tearing. The preconditioning serves to lower the natural frequency of the member to a predictable level. The following example illustrates a typical procedure:

*Example*

A sample torsional coupling having dimensional relationships corresponding to FIGURES 2 to 4 of the drawings is prepared for testing, the specific dimensions of the parts before assembly being as follows—

| Contoured rod (55): | Inches |
|---|---|
| Length | 0.730 |
| Diameter of end portions (56 & 57) | 0.310 |
| Min. diameter of neck (58) | 0.153 |
| Diameter of flanges (60 & 61) | 0.406 |
| Thickness of flanges (60 & 61) | 0.015 |
| Tubular torsion member (50): | |
| Length | 0.700 |
| Outer diameter of central portion | 0.405 |
| Diameter of bore (51) | 0.300 |
| Diameter of flanges (52 & 53) | 1.281 |
| Thickness of flanges (52 & 53) | 0.150 |

The contoured rod 55 is machined from stainless steel stock and the tubular member 50 is molded from "Disogrin IDSA 9250," a polyurethane molding compound in powdered form sold by Disogrin Industries of Manchester, New Hampshire.

The parts are assembled in the manner described above and a visible index mark is applied to each flange 52 and 53 adjacent bores 54 which are normally in line with one another. The coupling is then subjected to a static torsional load of 60 in.-lb. for 30 seconds with the deflection limited to 180° using the index marks as a guide.

When the 30 second time period has elapsed the deflection is readjusted and fixed at 180° for an additional 15 seconds, again using the index marks as a guide. The load is then released.

Tests comparing the coupling before and after preconditioning indicate the preconditioning reduces the natural resonant frequency of the coupling approximately 20%, or more particularly, from about 40 cycles per second to about 32 cycles per second in this instance. This is well below the resonant frequency of the pump with which the coupling is generally used.

It is believed that this condition is achieved due to the breaking of weak molecular cross-linkages in the longchain molecules of the polyurethane.

*Operation*

In the operation of the coupling B when used in connection with a rotary pump A as shown in FIGURE 1, a rotary drive having torsional vibrations such as that produced by a reciprocating engine is applied to the flange 52 and transmitted by the coupling to the pump A. The torsional vibrations transmitted by the rotary drive cause periodic angular displacement of the ends of the coupling relative to each other due to the elasticity of the material. When the amplitude of the torsional vibrations is relatively low, the vibrations are almost completely dampened out due to the softness of the spring characteristic of the tubular member 50. The dampening is assisted by the dissipative resistance deriving from the friction between the end portions 56 and 57 of the contoured rod 55 and the bore 51, and from the friction between the end faces of the tubular member 50 and the inner faces of the radial flanges 60 and 61 of the rod 55.

As the amplitude of the vibrations increases the angular displacement of the ends of the coupling causes constriction of the central portion of the tubular member 50 into the space defined by the neck portion 58. At this point the rod 55 resists further twisting which causes a rapid increase in the elastic restoring force of the coupling.

As the frequency of the torsional vibrations approaches the natural resonant frequency of the pump A there is a tendency for the amplitude of the vibrations to increase quite sharply. However, as the amplitude increases the elastic restoring force of the coupling exhibits a rapid non-linear increase which prevents the coupling from stabilizing at a particularly resonant frequency. Accordingly the vibrations transmitted by the rotary drive will be substantially dampened even in the vicinity of the natural resonant frequency of the pump.

While the device of the invention has been described and depicted with reference to specific embodiments thereof, these are intended for the purpose of illustration rather than limitation and other variations and modifications will occur to those skilled in the art upon a reading of the specification and I do not want to be limited in the scope and effect of my patent to the forms or embodiments of my invention herein specifically illustrated and described, nor in any manner inconsistent with the progress by which the art has been promoted by my invention.

I claim:

1. A torsional coupling device for isolating a rotary load from vibrations transmitted by a rotary drive comprising:
   a tubular member formed of an elastomeric material and having a central bore,
   means for connecting one end of said member to said rotary drive,
   means for connecting the other end of said member to said rotary load, and
   a contoured rod located in said bore, said rod having end portions with surfaces engaging the adjacent walls of said bore and a central neck portion of smaller radial dimension than said end portions.

2. A device as defined in claim 1 wherein said tubular member has radial flanges at each end thereof, said flanges having symmetrically spaced marginal bores former therein.

3. A device as defined in claim 1 wherein said contoured rod has radial flanges at each end thereof, the inward surfaces of which bear against the end faces of said tubular member, to resist axial elongation of said member.

4. A device as defined in claim 1 wherein the axial cross section of said neck portion defines a catenary curve.

5. A device as defined in claim 1 wherein said tubular member is formed of polyurethane.

6. A device as defined in claim 1 wherein said tubular member is formed of polypropylene.

7. A device as defined in claim 1 wherein said rod is located in said bore with an interference fit whereby the friction between surface portions of said rod and surface portions of said bore serves to dampen torsional oscillations transmitted to said device.

8. A device as defined in claim 1 wherein said tubular torsion member is prestressed by torsional deformation to provide a predetermined reduced natural frequency therefore.

9. A device as defined in claim 1 wherein said device has a resonant frequency below the resonant frequency of said rotary load and wherein the elastic restoring force of said device increases non-linearly with an increase in the amplitude of vibrations transmitted thereto.

10. In combination, a rotary fluid pump and a torsional coupling device for isolating said pump from vibrations transmitted by a rotary drive, said device comprising:
   a tubular torsion member formed of an elastomeric material and having a central bore,
   means for connecting one end of said member to said rotary drive,
   means for connecting the other end of said member to said pump, and
   a contoured rod located in said bore, said rod having end portions of substantially the same diameter as said bore and a central neck portion of smaller diameter than said end portions whereby portions of said tubular member constrict into said neck portion when said member is twisted by a torsional load.

References Cited

UNITED STATES PATENTS

| 2,439,241 | 4/1948 | Curtis et al. | 103—118 X |
| 2,752,122 | 6/1956 | Hyatt et al. | 64—6 X |

FOREIGN PATENTS

| 703,565 | 5/1931 | France. | |

ROBERT M. WALKER, *Primary Examiner.*